(12) United States Patent
Moore

(10) Patent No.: US 6,657,123 B2
(45) Date of Patent: Dec. 2, 2003

(54) POWER DISTRIBUTION CABINET

(75) Inventor: Marshall R. Moore, Tampa, FL (US)

(73) Assignee: Tampa Armature Works, Inc., Tampa, FL (US)

( * ) Notice: Subject to any disclaimer, the term of this patent is extended or adjusted under 35 U.S.C. 154(b) by 162 days.

(21) Appl. No.: 09/682,637

(22) Filed: Oct. 1, 2001

(65) Prior Publication Data

US 2003/0062182 A1 Apr. 3, 2003

(51) Int. Cl.[7] ................................................ H05K 5/00
(52) U.S. Cl. .......................... 174/50; 174/59; 174/38; 361/601; 361/602; 361/641; 361/679; 361/736; 361/333; 439/92; 312/223.6
(58) Field of Search ........................... 174/38, 59, 50; 361/601, 602, 625, 641, 644, 679, 736, 357, 334, 331, 332, 335, 356, 376, 333; 206/386; 439/92; 307/150; 312/223.6

(56) References Cited

U.S. PATENT DOCUMENTS

| | | | | |
|---|---|---|---|---|
| 4,425,598 A | * | 1/1984 | Pyle ............................ 361/648 |
| 5,212,623 A | * | 5/1993 | Wilson et al. ............... 361/625 |
| 5,644,991 A | * | 7/1997 | Prevot et al. ............... 108/54.1 |
| 5,787,659 A | * | 8/1998 | Rinehart ..................... 52/204.52 |
| 5,857,769 A | * | 1/1999 | Beggs ........................ 362/294 |
| 5,901,033 A | * | 5/1999 | Crawford et al. ........... 361/600 |
| 6,070,726 A | * | 6/2000 | Graham ...................... 206/386 |

* cited by examiner

Primary Examiner—Dean A. Reichard
Assistant Examiner—Anton Harris
(74) Attorney, Agent, or Firm—Anton J. Hopen; Smith & Hopen, P.A.; Molly L. Sauter

(57) ABSTRACT

A power distribution cabinet for containing electrical components and associated circuitry includes a panel adapted to provide an interface for the distribution of power from a high voltage source to low voltage applications. The panel includes several outlet receptacle housings, wherein the housings are each L-shaped and disposed contiguously in a vertical series on the front of the cabinet each at a 45-degree angle. Collateral damage to the power distribution center can be minimized wherein a damaged single housing can be replaced without disturbing the remaining housings or outlet receptacles, thereby maintaining the operability of the power distribution center. The housings each comprise several weep slots disposed at the hydraulically lowest point of each of the housings so that condensation that forms on an inner surface of the housing is collected and drained through the weep slots thereby preventing any moisture damage to the interior circuitry and electrical components.

11 Claims, 5 Drawing Sheets

FIG. 4
FIG. 5
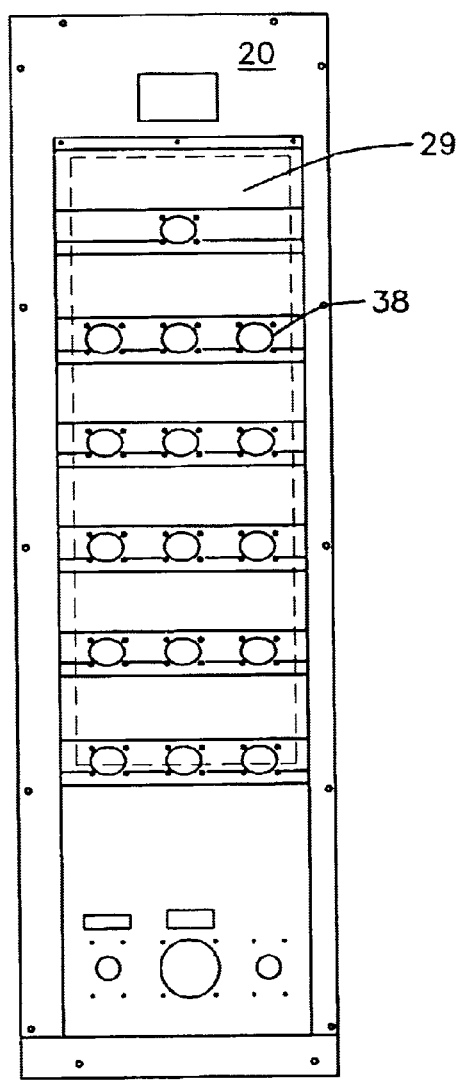
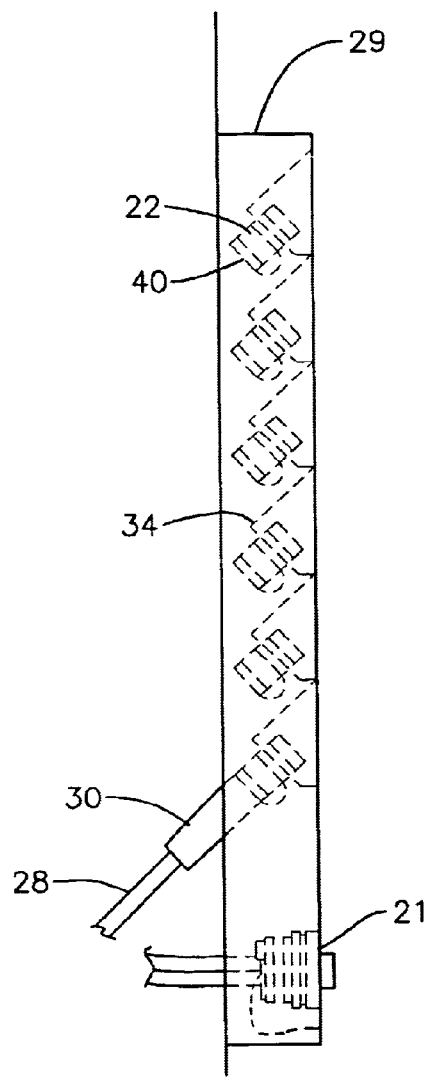

POWER DISTRIBUTION CABINET

BACKGROUND OF INVENTION

1. Field of the invention

This invention relates, generally, to power distribution cabinets. More particularly, it relates to a power distribution cabinet with an improved outlet receptacle panel for protection of the internal circuitry housed within the power distribution cabinet.

2. Description of the Prior Art

Power distribution centers are used to transform high voltage to lower voltages for a variety of applications. Cabinets contain and protect the circuitry and transformers of the power distribution centers from adverse environmental conditions. Within the power distribution cabinet, the voltage is stepped down to the desired amperage and routed to an appropriate outlet receptacle mounted on the exterior of the cabinet. Typical outlet receptacles include 15 amp, 60 amp, and 200 amp configurations. The power distribution cabinet may have fifteen or more outlet receptacles of varying capacities.

When an exterior electrical cable is plugged into the outlet receptacle, the electrical cable end provides a means to securely attach the cable end to the outlet receptacle. A standard connection in the art is an outlet receptacle that includes a plurality of tabs and grooves with the cable end having a complementary plurality of tabs and grooves. Once the cable end and outlet receptacle are properly mated and fitted together, the connection between the cable end and the outlet receptacle provides a desirable and relatively unbreakable connection. A secure connection with the outlet receptacle is an important feature of any type of power distribution center to avoid accidental disconnection and interruption of power. Having a relatively unbreakable connection between the cable end and the outlet receptacle is particularly imperative when the power distribution center is used in areas with heavy vehicle movement as in military operations. Several electrical cables are often in simultaneous communication with the power distribution center with the cables disposed on the ground being routinely run over by vehicles. Occasionally, however, a cable may inadvertently become tangled with a vehicle and consequently be dragged by a vehicle. In the case of an electrical cable being inadvertently dragged, any slack in the electrical cable is eventually taken up and a sudden tension force generated on the electrical cable, cable end, outlet receptacle connection and ultimately the power distribution cabinet. The usually desirable and relatively unbreakable connection between the electrical cable and the outlet receptacle is then very undesirable and causes destructive consequences. Any tension forces in the cable are transferred to the outlet receptacle that is attached to the power distribution panel. This in turn causes the panel to be violently pulled apart from the support means of the power distribution center breaking both electrical and structural connections and exposing the interior of the power distribution center to potentially adverse environmental conditions. Moisture that is allowed to enter the interior of the power distribution cabinet because of the breach in the power distribution cabinet can cause further damage by shorting out electrical components, such as the transformers housed within the power distribution cabinet. Damage to the transformers and other internal components will require time-consuming replacement. Furthermore, not only is the one outlet receptacle that caused the panel to be pulled apart damaged, the other outlet receptacles connected to the panel are also damaged and must be replaced. Any additional circuitry within the panel distribution cabinet that was damaged must also be repaired to place the power distribution center back on line. Thus, one outlet receptacle can shut down an entire power distribution center and all applications depending on that center. The repairs may take several valuable hours. The delay in getting the power distribution center back on line may be critical in military applications, where military operations may be dependent on that particular power distribution center to function properly.

In summary, previous attempts or teachings of power distribution cabinets have not provided a mechanism by which collateral damage to the power distribution center can be minimized while maintaining secure connections between the outlet receptacles and cables. Specifically, previous power distribution panels are susceptible to damage from inadvertent and excessive tension forces from electrical cables attached to outlet receptacles mounted on the distribution panel. Thus, a power distribution cabinet that minimizes collateral damage and retains all the advantageous properties of a power distribution center with multiple outlet receptacles is needed.

Continuing efforts are being made to improve the durability of power distribution cabinets. By way of example, note U.S. Pat. No. 5,212,623 to Wilson et al. (hereinafter "Wilson") that describes a portable power distribution cabinet with outlet receptacles that extend outwardly and downwardly from a support surface of the power distribution center. The electrical cables being attached to the power distribution cabinet are typically of heavy gauge and the outwardly and downwardly disposed outlet receptacles provide a more natural path from the electrical cable lying on the ground to the outlet receptacle. Therefore, when the electrical cable end is attached to the outlet receptacle, the static forces generated between the cable end and outlet receptacle are reduced and thereby protects the cable and outlet receptacle from fatigue. Wilson does not provide an improved means to reduce damage to the power distribution center from excessive tension forces caused by an electrical cable attached to the power distribution cabinet inadvertently being dragged.

Notwithstanding the existence of such prior art power distribution cabinets, there is a need for an improved power distribution cabinet for currently available outlet receptacles that can be utilized in military as well as in commercial applications and that minimize collateral damage to the power distribution capabilities of the power distribution center. In view of the prior art, considered as a whole, at the time the present invention was made, it was not obvious to those of ordinary skill in the pertinent arts how the problems associated with power distribution cabinets could be resolved. Therefore, it is an object of this invention to provide an improvement that overcomes the aforementioned inadequacies of the prior art devices and provides an improvement that is a significant contribution to the advancement of the power distribution cabinet art.

A primary object of the invention is to provide a power distribution cabinet that protects the power distribution center from the inadvertent and violent pulling on an outlet receptacle via an attached electrical cable.

These and other important objects, advantages, and features of the invention will become clear as this description proceeds.

SUMMARY OF INVENTION

The longstanding but heretofore unfulfilled need for a power distribution cabinet that provides protection to a power distribution center from an inadvertently pulled and attached electrical cable is now met by a new, useful, and nonobvious invention. The novel power distribution cabinet for containing electrical components and associated circuitry includes a frame having a front, a rear, and opposing sides, wherein the frame provides the upper structural support for said power distribution cabinet. A lower support structure is adapted to receive the frame atop the lower support structure, wherein the lower support structure is adapted to be lifted by a forklift for moving the power distribution cabinet.

A novel power distribution panel is adapted to provide an interface for the distribution of power from a high voltage source to low voltage applications. The panel includes several outlet receptacle housings, wherein said housings are each L-shaped having an upper and lower face. The housings are disposed contiguously in vertical series on the front of the frame at a substantially 45-degree angle thereby forming the novel power distribution panel. Furthermore, the housings each comprise a number of horizontally disposed apertures on a downward face of the housings and each aperture is adapted to receive an outlet receptacle. The number of outlet receptacles on each housing depends on a particular application and are variable. The housings each comprise several weep slots disposed at a hydraulically lowest point so that condensation that forms on an inner surface of the housing is collected and drained to the exterior of the cabinet through the weep slots thereby preventing any moisture damage to the interior circuitry and electrical components.

The outlet receptacles assembled and mounted to the housings eclipse the apertures forming an imperforated power distribution panel and thereby further preventing moisture and other potentially damaging contaminants from entering the power distribution cabinet. Plates form an enclosure that surrounds the upper support frame and adjoins the novel panel thereby forming a complete protective barrier for the electrical circuitry and electrical components of the power distribution center.

The foregoing has outlined rather broadly the more pertinent and important features of the present invention in order that the detailed description of the invention which follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims.

BRIEF DESCRIPTION OF DRAWINGS

For a fuller understanding of the nature and objects of the invention, reference should be made to the following detailed description, taken in connection with the accompanying drawings, in which:

FIG. 4 is a front elevational view of the power distribution panel;

FIG. 5 is a side elevational view of the power distribution panel;

DETAILED DESCRIPTION

Figure 1:
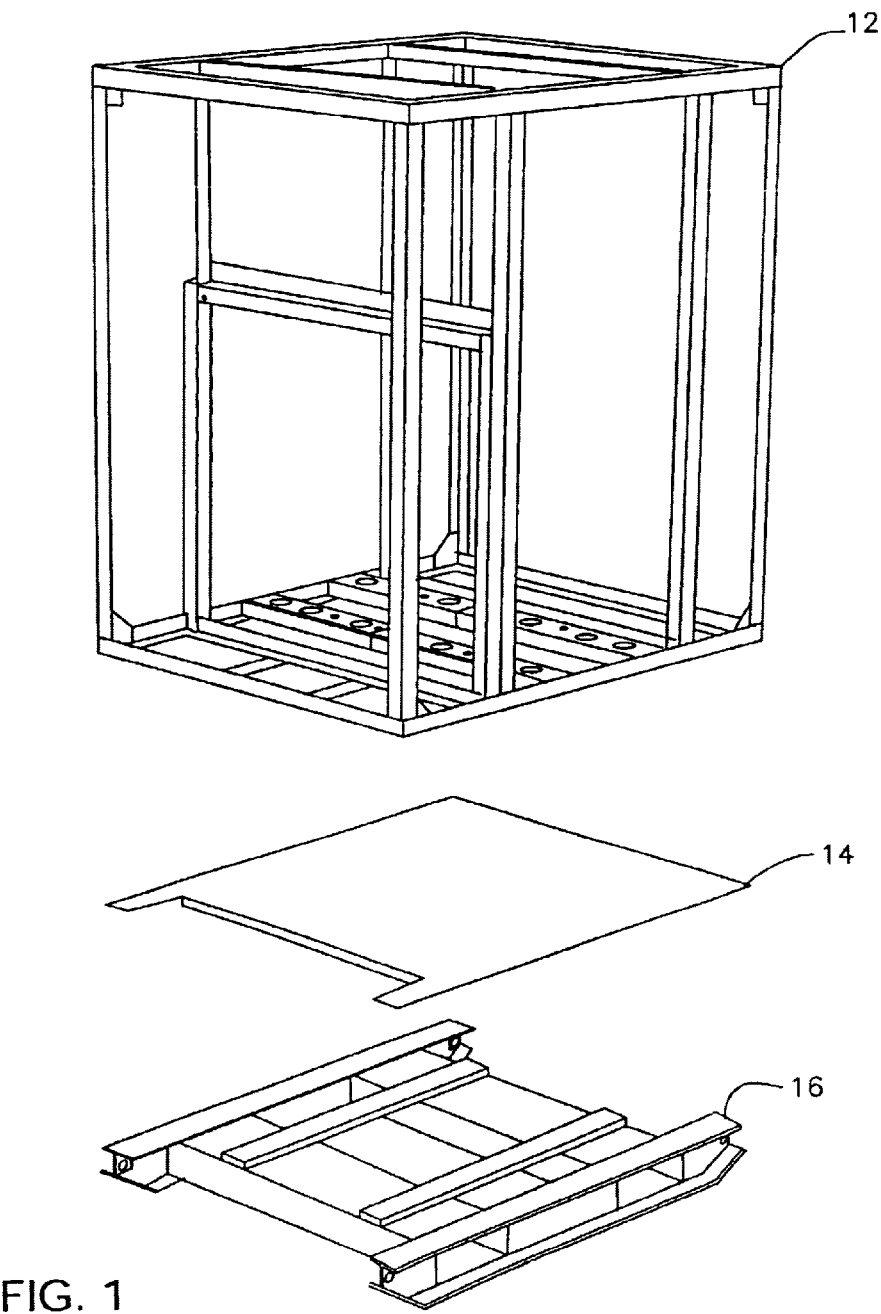
FIG. 1 is a perspective view of structural components of the power distribution cabinet.

The novel power distribution cabinet for containing electrical components and associated circuitry includes an upper frame 12 and a lower structure 16 as shown in FIG. 1. A cabinet floor 14 is sandwiched between upper frame 12 and lower structure 16 to provide a solid surface that protects the internal components of the power distribution center from damage and to provide a surface to attach electrical components.

Figure 2:
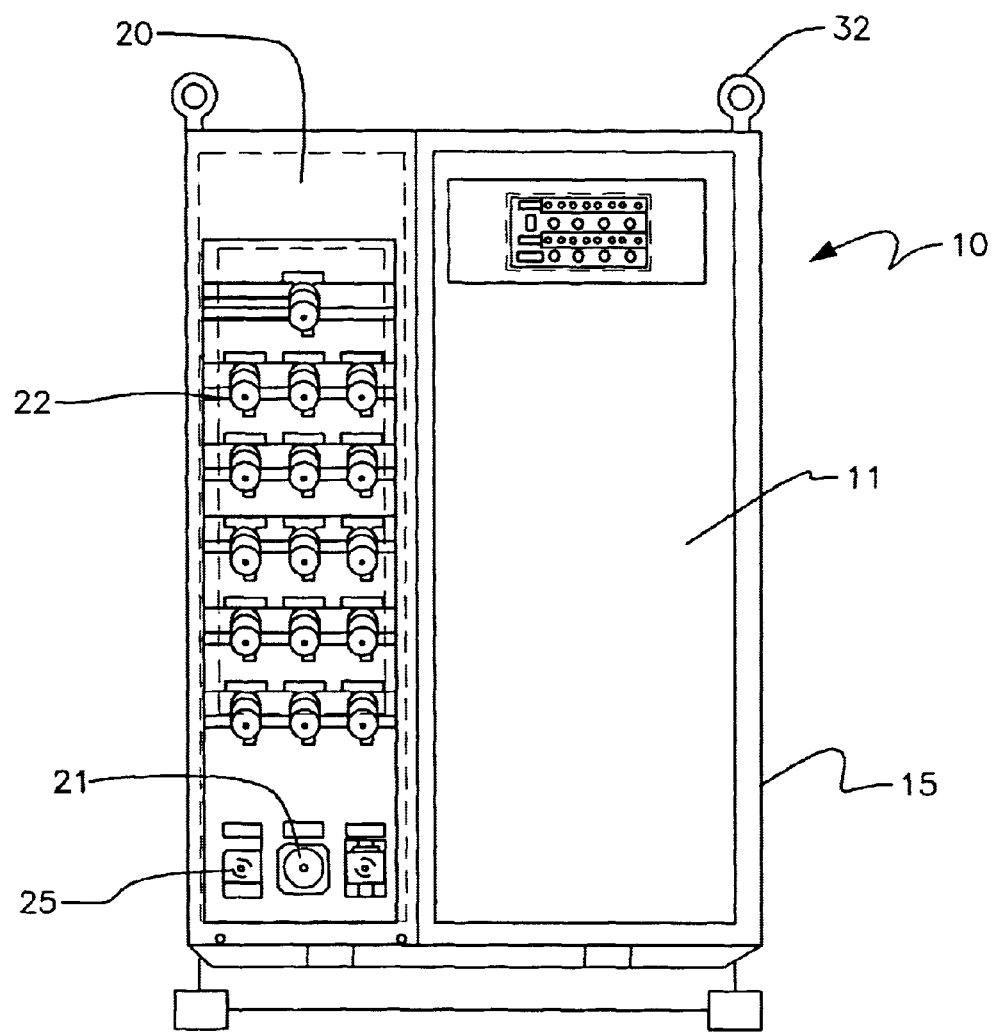
FIG. 2 is a front elevational view of the power distribution cabinet.

Referring to FIG. 2, it will there be seen that the reference numeral 10 denotes an illustrative embodiment of the present invention. It should be understood from the outset that the invention to be disclosed has utility with power distribution cabinets of all types and sizes. The cabinet denoted 10 is merely one type of cabinet and the invention is not restricted to power distribution cabinet of the type depicted. Cabinet 10 includes a power distribution panel 20 that further includes outlet receptacles. In the preferred embodiment, all outlet receptacles are standard military construction. Outlet receptacles 22 are 60 amp, 250V 3-phase receptacles with higher current outlet receptacle 21 providing 200 amp distribution and low current outlet receptacles 25 providing 15 amp. Pick-ups 32 are provided as a means to move the power distribution cabinet by aerial means and are attached to upper frame 12 and in the preferred embodiment the pick-ups are eyebolts each with a six-inch shank and a two-inch inside diameter. An aluminum enclosure 15 is welded and bolted to upper frame 12 providing further protection to the internal components of power distribution cabinet 10. Access door 11 provides access to the internal components of power distribution cabinet 10.

Figure 3:
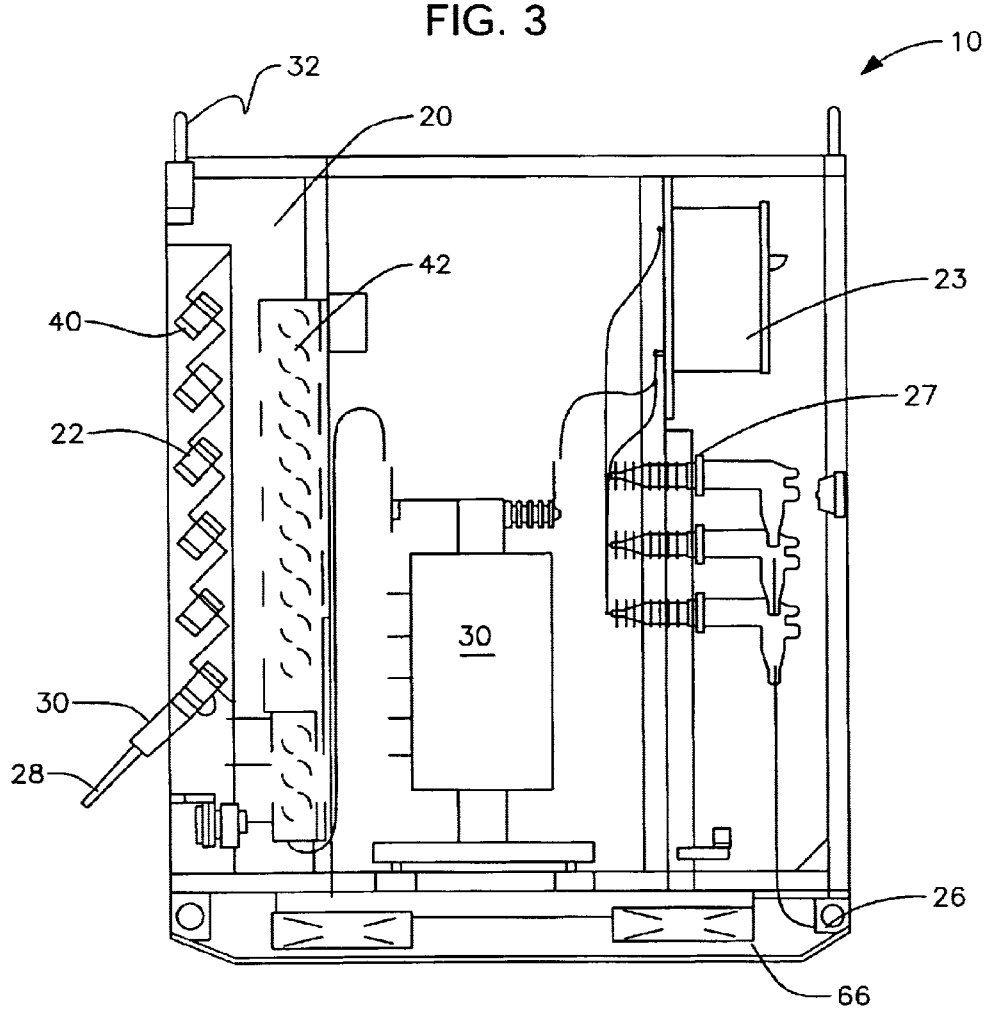
FIG. 3 is a side elevational view of the power distribution cabinet.

FIG. 3 shows a partial side elevational view of the internal components of power distribution cabinet 10. Transformers 24 are located centrally within cabinet 10 between the high voltage power port 26 and power distribution panel 20. Panel 20 includes several outlet receptacles 22 disposed outwardly and downward from panel 20. Outlet receptacle covers 40 screw onto respective outlet receptacles 22 providing a barrier to adverse environmental conditions when receptacles 22 are not being used. Cable end 30 is shown connected to outlet receptacle 22 providing electrical communication for a particular application (not shown). A portion of cable 28 is shown in electrical communication with panel 10 forming an electronic conduit from the power distribution cabinet 10. EFD switches 23 are mounted above the bushing wells 27 within cabinet 10 and in electrical communication with transformer 24 and bushings 27. Circuit breakers 42 protect transformers 24 from damage. Forklift slots 66 are provided as a means to move the power distribution cabinet by a forklift and are formed within lower structure 16.

Power distribution panel 20 includes a mounting frame 29 for the individual outlet receptacle housings 34 as shown in FIGS. 4 and 5. Mounting housings 34 are shown vertically and serially displaced on mounting frame 29. Housings 34 are disposed at a substantially 45-degree angle thereby forming the novel power distribution panel. In each housing 34 apertures 38 are formed that provide an opening for outlet receptacles 22 to be mounted within. Any number of apertures 38 may be used on each housing 34 for a particular need. High current receptacle 21 is provided on the lower portion of panel 20 to provide 200 amp service.

Figure 6:
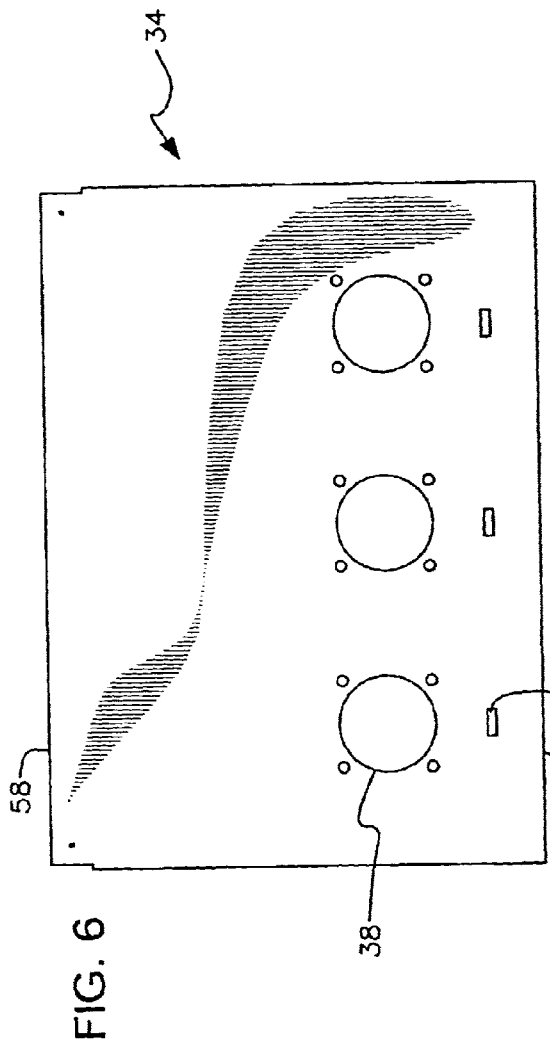
FIG. 6 is a frontal view of an unformed power distribution panel housing.
Figure 8:
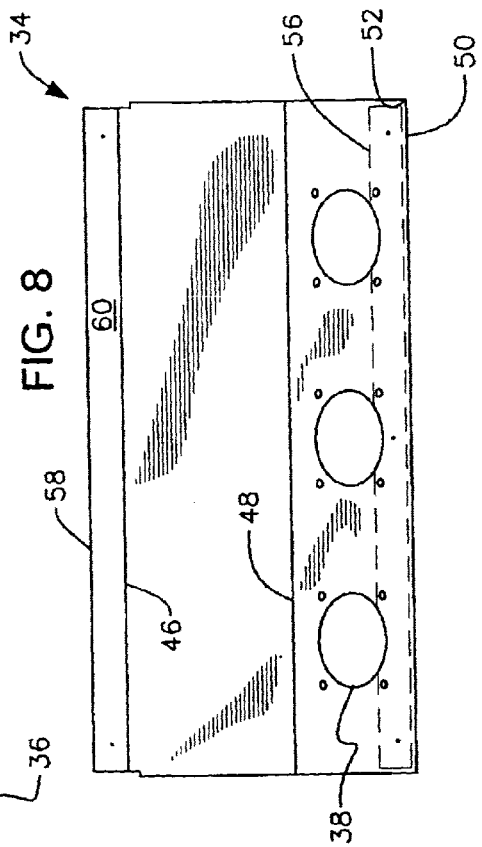
FIG. 8 is a frontal view of a power distribution panel housing.
Figure 7:
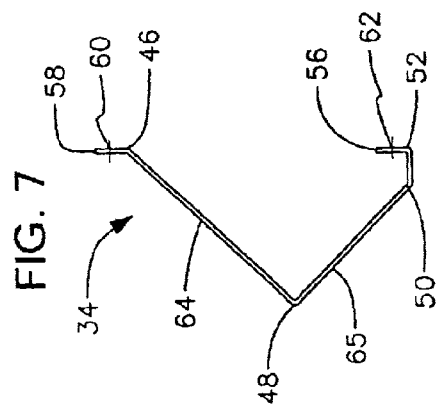
FIG. 7 is a side elevational view of a power distribution panel housing.

FIG. 6 is a frontal view of housing 34 before being formed into the desired L-shape. Apertures 38 are disposed horizontally along the bottom portion of housing 34. Weep slots 36 provide a means for moisture from condensation to drain from behind panel 20 to the exterior of cabinet 10 thereby protecting internal circuitry and components from damage. The dimension between top housing edge 58 and bottom housing edge 56 will ultimately define the size of housing 34. Housing 34 is formed by a 135-degree outward angle along an upper flange line 46 delineating top flange 60. A 90-degree inward angle is formed at the center of housing 48 to delineate the L-shaped housing 34. A 135-degree inward angle is formed at the lowermost plane 50 of the housing to provide a horizontal surface for weep slots 36 to be formed thereon. A final 90-degree inward angle is constructed along lower flange line 52 to form the bottom flange 62. Once the housing is formed into an L-shape as shown by the side elevational view in FIG. 7, a top flange 60 and bottom flange 62 are used to mount housing 34 to mounting frame 29. The final configuration of housing 34 is shown in FIG. 8 where housings 34 are each L-shaped having an upper 64 and lower face 65. The housings each comprise a number of horizontally disposed apertures 38 on a downward face 65 of the housings 34 and each aperture 38 is adapted to receive an outlet receptacle 22. The number of outlet receptacles 22 on each housing 34 depends on a particular application.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for maintaining the structural integrity of a power distribution cabinet, comprising:
   a power distribution panel further comprising a mounting frame and at least one outlet receptacle housing, the outlet receptacle housing detachably secured to the mounting frame;
   the outlet receptacle housing comprising a two-dimensional upper planar surface and a two-dimensional lower planar surface;
   the outlet receptacle housing lower planar surface further comprising at least one aperture;
   an outlet receptacle positioned within the at least one aperture forming a substantially 90° angle between the outlet receptacle and the lower planar surface, the outlet receptacle being releasably secured to the outlet receptacle housing; and
   the outlet receptacle housing being detached from the mounting frame without damage to the mounting frame when the outlet receptacle is not released from the outlet receptacle housing upon application of an external force of sufficient magnitude to separate the outlet receptacle from the outlet receptacle housing.

2. The power distribution cabinet of claim 1, further comprising:
   an outlet receptacle cover for each said outlet receptacle that includes an internal complementary filling to an exterior complementary fitting of said outlet receptacle.

3. The power distribution cabinet of claim 1, further comprising:
   a pick-up means so that said power distribution cabinet can be moved as a unit to a desired location.

4. An apparatus for maintaining the structural integrity of a power distribution cabinet, comprising:
   a power distribution panel further comprising a mounting frame and at least one outlet receptacle housing, the outlet receptacle housing detachably secured to the mounting frame;
   the outlet receptacle housings are each L-shaped having a two-dimensional upper planar surface and a two-dimensional lower planar surface;
   the outlet receptacle housing lower planar surface further comprising at least one aperture;
   the at least one outlet receptacle housings disposed on said panel mounting frame at an angle not perpendicular to said panel; and
   the at least one outlet receptacle housing further comprising at least one weep slots disposed at a hydraulically lowest point so that condensation that forms on an inner surface of said outlet receptacle housing is collected and drained through said weep slots thereby preventing any moisture damage to said circuitry and said electrical components.

5. The power distribution cabinet of claim 4 further comprising:
   an outlet receptacle positioned within the at least one aperture forming a substantially 90° angle between the outlet receptacle and the lower planar surface, the outlet receptacle being releasably secured to the outlet receptacle housing, the outlet receptacle mounted to said housing so that said receptacles eclipse said apertures forming an imperforated power distribution panel and thereby preventing moisture and other potentially damaging contaminants from entering said power distribution cabinet.

6. An apparatus for maintaining the structural integrity of a power distribution cabinet, comprising:
   a frame having a front, a rear, and opposing sides, wherein said frame provides the upper structural support for said power distribution cabinet;
   a lower support structure to receive said frame atop said lower support structure, wherein said lower support structure is to be lifted by a forklift for moving said cabinet;
   a power distribution panel further comprising a mounting frame and at least one outlet receptacle housing, the outlet receptacle housing detachably secured to the mounting frame;
   the at least one outlet receptacle housing being L-shaped having a two-dimensional upper planar surface and a two-dimensional lower planar surface;
   the at least one outlet receptacle lower planar surface further comprising at least one aperture;
   the at least one outlet receptacle housing further comprising at least one weep slots disposed at a hydraulically lowest point so that condensation that forms on an inner surface of said outlet receptacle housing is collected and drained through said weep slots thereby preventing any moisture damage to said circuitry and said electrical components;

at outlet receptacle positioned within the at least one aperture forming a substantially 90° angle between the outlet receptacle and the lower planar surface, the outlet receptacle being releasably secured to the outlet receptacle housing; and the outlet receptacle housing being detached from the mounting frame without damage to the mounting frame when the outlet receptacle is not released from the outlet receptacle housing upon application of an external force of sufficient magnitude to separate the outlet receptacle from the outlet receptacle housing, enclosure plates that surround said frame and adjoin said panel thereby forming a complete protective baffler for said electrical circuitry and said electrical components.

7. The power distribution cabinet of claim 6, wherein said housings each further comprises:

an upper and lower flange disposed in parallel orientation to said mounting frame so tat each housing is mountable upon said mounting frame.

8. The power distribution cabinet of claim 6, wherein said upper frame further comprises:

aerial pick-ups attached to said upper frame so that said cabinet is movable through aerial means to a desired location.

9. The power distribution cabinet of claim 6, wherein the outlet receptacle is rated for 15 amp applications.

10. The power distribution cabinet of claim 6, wherein the outlet receptacles is rated for 60 amp applications.

11. The power distribution cabinet of claim 6, wherein the outlet receptacles is rated for 200 amp applications.

* * * * *